INVENTORS.
RONALD L. BAUER
WALTER C. BUCK
CHARLES W. MUNZ

ATTORNEY

United States Patent Office 3,494,324
Patented Feb. 10, 1970

3,494,324
SYSTEM FOR CONTROLLING THE AIR SUPPLY TO COATING-SCREEDING AIR KNIVES
Ronald L. Bauer, Pleasant Hills Borough, Walter C. Buck, West Mifflin Borough, and Charles W. Munz, Baldwin Township, Allegheny County, Pa., assignors to United States Steel Corporation, a corporation of Delaware
Filed Mar. 4, 1968, Ser. No. 710,373
Int. Cl. B05c 11/00
U.S. Cl. 118—4       4 Claims

ABSTRACT OF THE DISCLOSURE

The pressure of the air in an air knife for screeding excess coating material from a strip after it has passed through an immersion bath, is controlled by a valve in the supply line. The valve is moved by an actuator in response to the existing pressure in the knife and the speed of the strip leaving the coating bath. The knife pressure is communicated to a controller for the valve actuator. A function generator governed by a tachometer connected to the conveyor, supplies further input to the controller. When the line is shut down, an artificial pressure is introduced into the controller to cause the valve actuator to hold the valve partly open to maintain a minimum air flow through the knife.

Background of the invention

This invention relates to a system for controlling the air supply to air knives used to screed excess coating material from strip after passage through a coating bath, in accordance with the speed of the strip. In particular, the invention is a system for automatically controlling the air supply so as to maintain a substantially uniform coating thickness, despite unavoidable variations in the strip speed.

From the prior experience with air knives installed at the exit from spelter pots used in the continuous galvanizing of steel strip, it is known that the thickness of the coating left on the strip varies directly with the speed of the strip through the coating line. Hence it has been customary to alter manually the pressure of the air supplied to the knives when a change in strip speed occurs. Our invention is a system for effecting such adjustment automatically and immediately whenever such change occurs, thus insuring a more uniform coating thickness on the product throughout its length.

Brief summary of the invention

In a preferred embodiment of our invention, we control the volume of air admitted to the air knives. To this end we provide an inlet valve and means for opening and closing it in response to a fluid-pressure signal. We also provide a signal-generating means controlled by pressure in the knives, the strip speed and manually settable modifiers acting thereon, to allow for the effect of parameters inherent in the system. The fluid-pressure control signal is applied to a controller which governs the inlet-valve operating means. We further provide means for maintaining an artificial fluid-pressure signal when the coating line is shut down, to prevent shutting off the air supply to the knives.

Brief description of the drawings

A complete understanding of the invention may be obtained from the following detailed description and explanation which refer to the accompanying drawings illustrating the present preferred embodiment. In the drawings.

Detailed description of the preferred embodiment

Figure 1:
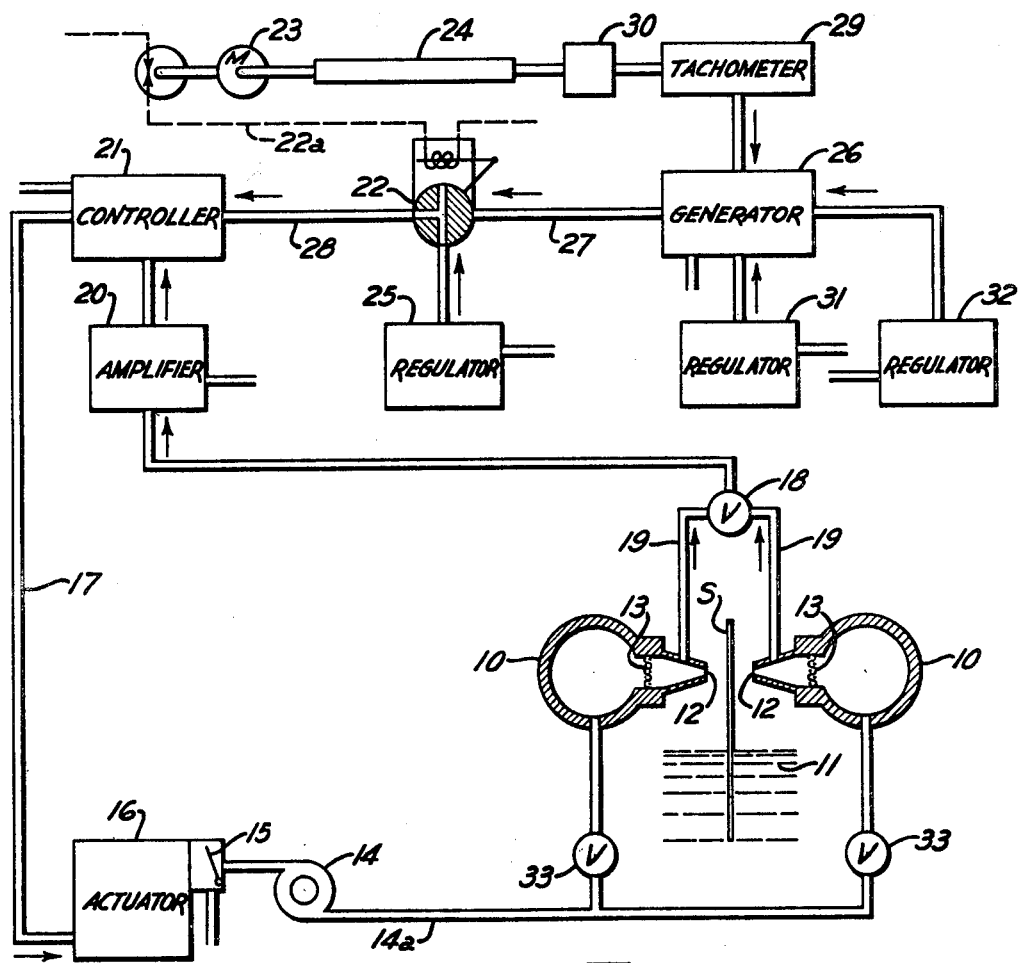
FIGURE 1 is a schematic diagram of our system showing the various elements thereof, which are known per se, and the manner in which they are connected to perform the function outlined above.

Referring now in detail to the drawings, and particularly to FIGURE 1, spaced elongated air knives 10 discharge brush-type screeding jets across the width and against the surfaces of strip S emerging from a molten-spelter bath 11 and passing upwardly between the knives.

The knives are simply lengths of pipe having outlet slots 12 adjacent the strip and screens 13 of fine mesh back of them to assure substantially uniform distribution of the outflowing air. Air is supplied to the knives by a blower 14 the inlet of which is controlled by a butterfly valve 15, through a pipe 14a and branches therefrom. A fluid-pressure valve actuator 16 moves the valve toward open or closed position, according to the fluid pressure applied to the actuator through a pipe 17. Actuator 16 is conveniently that made by Bailey Meter Company, Wickliffe, Ohio and designated P81-1.

The back pressure of the air in the outlets of knives 10 is transmitted to a 3-way valve 18 by pipes 19. By turning the valve one way or the other, the pressure in either one of the knives is selectively applied to a pneumatic amplifier 20 such as that made by Bailey Meter Company designated M42-2. Amplifier 20 delivers fluid pressure proportional to that existing in the selected knife to a controller 21 such as that made by Bailey Meter Company and designated P91-7. Controller 21 supplies a modified fluid pressure through pipe 17 to actuator 16.

The pressure output of controller 21 is modified by several parameters, by a connection including a solenoid valve 22 which operates in accordance with the state, idle or running, of a motor 23 driving a conveyor guide roll 24 which takes the strip S away from the coating apparatus. When motor 23 is stationary, valve 22 is deenergized and, in that condition, connects a manually controllable regulator 25 supplying artificial fluid pressure, to controller 21 to cause actuator 16 to keep valve 15 at least partially open, so air to knives 10 will not be completely shut off during periods when the galvanizing line is shut down. Regulator 25 is of the type made by Bailey Meter Company and designated P91-1. Valve 22 is operated by conventional means such as a suitable electric circuit, indicated at 22a, including a centrifugal switch operated by motor 23 or a voltage relay connected thereacross.

When the system is operating normally, valve 22 is energized and connects a fluid-pressure generator 26 to controller 21 through pipes 27 and 28. Generator 26 is of the type made by Bailey Meter Company and designated P92-3. The output of generator 26 is responsive to the speed of guide roll 24 by virtue of a fluid-pressure tachometer 29, such as that made by Bailey Meter Company designated P25-1. The tachometer is connected through a gear box 30 so as to be driven at a speed proportional to that of the guide roll. Generator 26 also has its output modified by manually settable input pressures from regulators 31 and 32 (identical to regulator 25) for a purpose to be explained.

It should be evident from the foregoing that, during normal operation, the opening of valve 15 and hence the supply of air to the knives, is controlled automatically in accordance with several variables. These include the pressure actually existing in one or the other of the knives (the one selected by the operation of valve 18), the speed of guide roll 24 and the settings of regulators 31 and 32.

Figure 2:
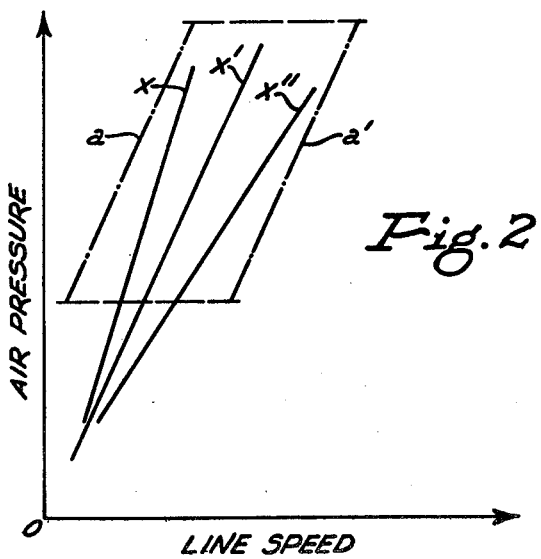
FIGURE 2 is a set of graphs illustrating the calibration of the system by means of the manually settable modifiers.

These latter, respectively, permit manual adjustment of (a) the bias, indicated by graphs $a$, $a'$ in FIGURE 2, i.e., the ratio of a particular value of air pressure in the knives to a particular speed of the line and (b) the rate of change of air pressure, indicated by graphs $x$, $x'$, $x''$ in FIGURE 2, with change in line speed. When automatic control of the pressure in one of the knives 10 has been established, the proper pressure in the other is obtained by adjusting the appropriate one of two manual balancing valves 33. When the galvanizing line is shut down for any reason, valve 22 is deenergized and generator 26 is cut off, leaving controller 21 subject only to source 25 (in addition to the pressure in one of the knives).

It is apparent that the system of our invention overcomes the objections inherent in attempts to control the pressure in the air knives manually in response to changes in the speed of the strip-galvanizing line. The use of fluid pressure as the control medium effects immediate response. The provision of an artificial control pressure when the line stops prevents a shut off of the air supply to the knives and thus avoids the warping thereof which would otherwise occur because of heating from the adjacent molten spelter.

We claim:

1. The combination with immersion strip-coating apparatus including an air knife and a strip-removal conveyor, of a system for controlling the supply of air to said knife comprising a valve, a power-actuator for said valve, a controller having its output connected to said actuator, a connection communicating to the input of said controller the pressure in said knife, and means applying as a further input to said controller, a signal proportional to the speed of said conveyor.

2. An apparatus as defined in claim 1, characterized by said signal-applying means being a fluid-pressure function generator and a tachometer driven at a speed proportional to that of the conveyor connected to said generator.

3. An apparatus as defined in claim 2, characterized by manually adjustable means for applying a secondary regulating signal to said generator.

4. An apparatus as defined in claim 1, characterized by means responsive to the conveyor speed effective to maintain a predetermined signal to said controller when said speed deviates from a predetermined value.

References Cited

UNITED STATES PATENTS

| | | |
|---|---|---|
| 2,955,342 | 10/1960 | Litzler et al. |
| 3,375,805 | 4/1968 | Beall et al. _____ 118—63 |

WALTER A. SCHEEL, Primary Examiner

JOHN P. McINTOSH, Assistant Examiner

U.S. Cl. X.R.

118—63

UNITED STATES PATENT OFFICE
CERTIFICATE OF CORRECTION

Patent No. 3,494,324                            February 10, 1970

Ronald L. Bauer et al.

It is certified that error appears in the above identified patent and that said Letters Patent are hereby corrected as shown below:

Column 3, line 27, "an air" should read -- a gas --; line 28, "air" should read -- gas --.

Signed and sealed this 24th day of November 1970.

(SEAL)
Attest:

Edward M. Fletcher, Jr.                        WILLIAM E. SCHUYLER, JR.
Attesting Officer                                   Commissioner of Patents